United States Patent
Tanaya et al.

(10) Patent No.: US 6,912,459 B2
(45) Date of Patent: Jun. 28, 2005

(54) CONTROL DEVICE FOR AN INTERNAL COMBUSTION ENGINE

(75) Inventors: Kimihiko Tanaya, Tokyo (JP); Masakazu Dohi, Hyogo (JP); Yumi Takaoka, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/779,624

(22) Filed: Feb. 18, 2004

(65) Prior Publication Data

US 2004/0230369 A1 Nov. 18, 2004

(30) Foreign Application Priority Data

May 14, 2003 (JP) ........................................ 2003-135731

(51) Int. Cl.$^7$ ............................................. F02D 45/00
(52) U.S. Cl. ..................................... 701/111; 73/35.08
(58) Field of Search .............................. 701/111, 102; 123/406.37, 406.39, 406.29; 73/35.08, 35.05, 35.06

(56) References Cited

U.S. PATENT DOCUMENTS 5,180,984 A * 1/1993 Murata et al. ......... 123/406.26
5,675,072 A * 10/1997 Yasuda et al. ............. 73/35.08
6,427,662 B2 * 8/2002 Tanaya et al. ............... 701/111

FOREIGN PATENT DOCUMENTS

| JP | 10-252632 A | * | 9/1998 | ............ F02P/17/12 |
| JP | 11-324881 A | | 11/1999 | |
| JP | 2001-355504 A | * | 12/2001 | ........... F02D/45/00 |

* cited by examiner

Primary Examiner—Hieu T. Vo
(74) Attorney, Agent, or Firm—Sughrue Mion, PLLC

(57) ABSTRACT

A control device for an internal combustion engine, including: an ion current detecting unit for detecting an ion current flowing between electrodes, via ions generated in a combustion chamber upon combustion, at a time when a voltage is applied to electrodes arranged in a combustion chamber of the internal combustion engine; a parameter extracting unit for extracting an ion current characteristics parameter correlating to an IMEP, from the ion current detected by the ion current detecting unit; an IMEP-related-information calculating unit for using the ion current characteristics parameter outputted from the parameter extracting unit, to calculate information relating to the IMEP of the internal combustion engine; and an internal combustion engine control unit for controlling operations of the internal combustion engine based on the output from the IMEP-related-information calculating unit.

9 Claims, 5 Drawing Sheets

CONTROL DEVICE FOR AN INTERNAL COMBUSTION ENGINE

BACKGROUND OF THE INVENTION

1. Field of the Invention

The present invention relates to a control device for an internal combustion engine, and more particularly to a control device for an internal combustion engine, which utilizes an IMEP or an IMEP variation amount calculated from an ionic volume, which is generated by combustion occurring in an internal combustion engine, to thereby control various internal combustion engine control parameters.

2. Description of the Related Art

In recent years, in view of strict environmental restrictions, there is increased need to detect limits in engine combustion, in particular a lean combustion limit and an exhaust gas recirculation (hereinafter referred to as EGR) limit, in order to improve fuel mileage.

The combustion limit is a point where the internal combustion engine (hereinafter sometime referred to as engine) is operated most effectively and in a stable fashion. Namely, what is important is how much fuel can be reduced while obtaining the same output, and achieving stable combustion to maintain product quality.

A cylinder pressure sensor is generally used as an indicator to measure these factors. An indicated mean effective pressure (hereinafter referred to as IMEP for short), obtained from the pressure inside the cylinder serves as the indicator.

However, there are problems in terms of the cost and durability of the cylinder pressure sensor, thus rendering it impractical.

A technique has been proposed, as one application of an ion current detector, which detects the combustion limit. This device uses as a probe a spark plug to detect a current of the ions generated during the combustion. (E.g., JP 11-324881 A)

However, the combustion limit detection method proposed in JP 11-324881 A only detects a limit point up to which combustion is possible. The method does not take into consideration the limit point at which the most efficient output can be obtained, nor detection of the combustion stability needed to secure a product quality of the engine. Thus, these kinds of detection were difficult to achieve with the technique proposed in JP 11-324881 A.

In order to control work efficiency of the engine, it is necessary to detect the IMEP, which is the actual combustion work. Furthermore, in order to discuss the stability of the engine, which contributes to secure the product quality of the engine, it is important to deal with the amount of variation occurring in the combustion work, to thereby achieve detection before variation occurs in the engine itself.

SUMMARY OF THE INVENTION

The present invention has been made to solve the above-mentioned problems, and it is therefore an object of the present invention to obtain a control device for an internal combustion engine which employs an inexpensively available ion current detector to calculate an IMEP amount and an IMEP variation amount, and which uses those values to control the operating state of the engine efficiently and precisely.

According to the present invention, a control device for an internal combustion engine, comprises: an ion current detecting means for detecting an ion current flowing between electrodes, via ions generated in a combustion chamber upon combustion, at a time when a voltage is applied to the electrodes disposed in the combustion chamber of the internal combustion engine; a parameter extracting means for extracting an ion current characteristics parameter. correlating to an IMEP, from the ion current detected by the ion current detecting means. The control device for an internal combustion engine also comprises: an IMEP-related-information calculating means for using the ion current characteristics parameter outputted from the parameter extracting means, to calculate information relating to the IMEP of the internal combustion engine. Further, the control device for an internal combustion engine comprises an internal combustion engine control means for controlling operations of the internal combustion engine based on the output from the IMEP-related-information calculating means.

Consequently, there is obtained a control device for an internal combustion engine which employs an inexpensively achievable ion current detector to calculate an IMEP or an IMEP variation amount, and uses these values to thereby control the operating state of the internal combustion engine efficiently and precisely.

DETAILED DESCRIPTION OF THE PREFERRED EMBODIMENTS

Embodiment 1

Description is now given with respect to an example of EGR limit control in accordance with Embodiment 1 of the present invention.

EGR is controlled so as to lower a combustion temperature and suppress amounts of NOx generated in the exhaust fuel, as well as decreases a loss of work in an internal combustion engine by partially converting an emission work to an intake work. In other words, increasing the EGR amount improves the work efficiency. Fuel mileage also improves. However, when EGR is over-applied, combustion characteristics degrade to cause a degradation of work efficiency.

Further, when an accidental fire is caused by over-application of EGR, cleansing catalysts which cleans exhaust gas are damaged and they may be broken. Therefore, it is common to provide a large margin to account for fluctuation in manufactured engine parts and fluctuation in environmental factors. A degree of opening of EGR valve are set as map values determined individually for each state of operation at a point that does not cross the EGR limit.

As a result, there is substantial room for improving work efficiency with respect to each manufactured engine part. In recent years, high hopes have been pinned on EGR limit control as a way to improve the fuel mileage.

A point to be detected as the EGR limit point is earlier one of the following two points: 1) a point at which the output decreases from the internal combustion engine output at a initial EGR amount timing by a given amount when the EGR amount is increased, or 2) a point at which an amount of variation in the output exceeds a predetermined amount.

To detect the EGR limit point, either an IMEP or an IMEP variation rate may be detected. An ion current signal is used to obtain the IMEP or the IMEP variation rate.

Embodiment 1 of the present invention is explained below with reference to the drawings.

Figure 1:
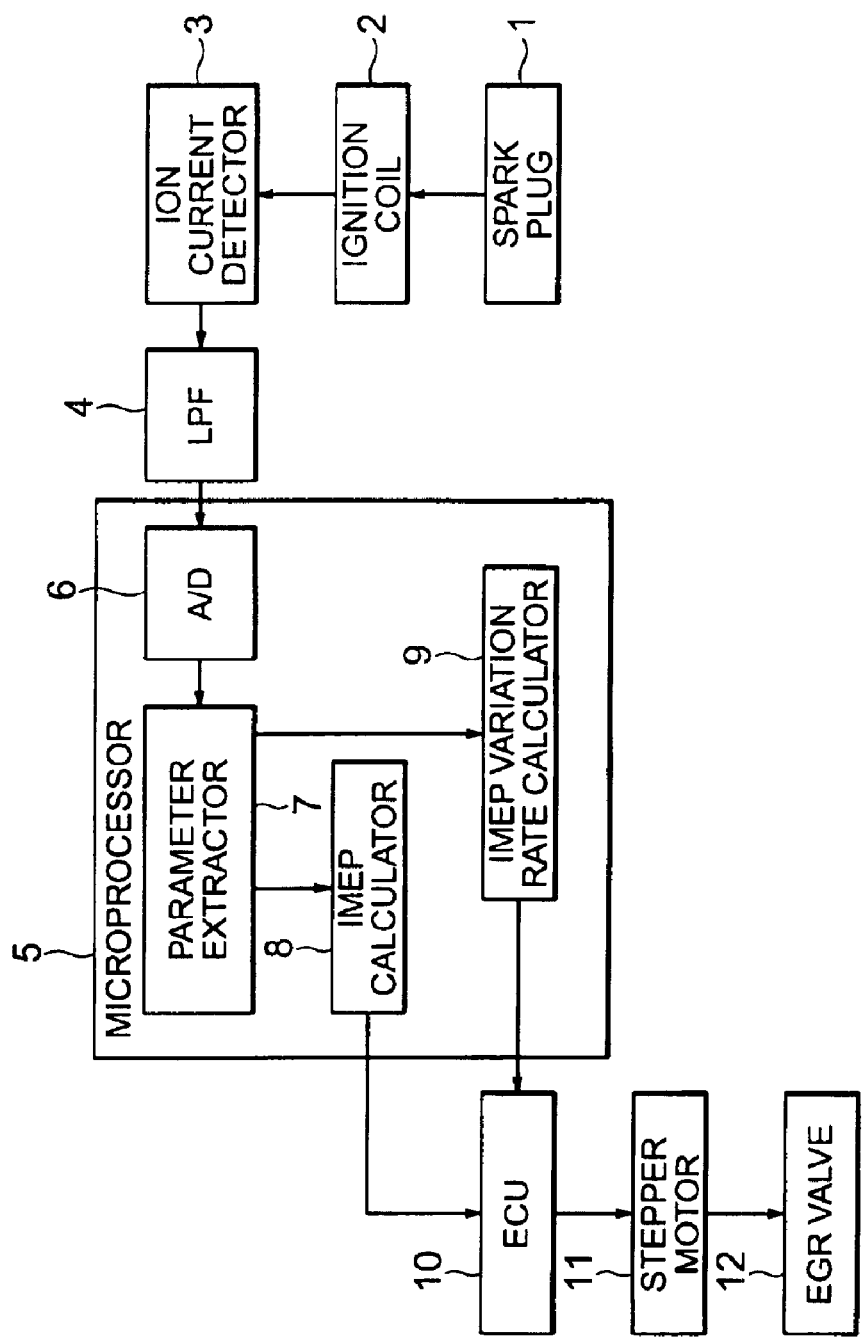
FIG. 1 is a block diagram showing a construction of an EGR limit control device of an internal combustion engine in accordance with Embodiment 1 of the present invention.

FIG. 1 is a constructional diagram of an EGR limit control device according to Embodiment 1. In the diagram, reference numeral 1 denotes a spark plug. With the spark plug 1 serving as a probe, the detected ions are outputted as the ion current signal by an ion current detector 3, via an ignition coil 2. Specifically, the ion current detector 3 applies a voltage to electrodes arranged to a combustion chamber in the engine. When the combustion occurs, the ion current detector 3 detects the ion current flowing between the electrodes via the ions generated inside the combustion chamber.

The ion current signal passes through an analog low-pass filter (LPF) 4 so that noise (such as impulse noise) that is not related to the combustion is eliminated. After that, the ion current signal is inputted into a microprocessor 5, and then an A/D converter 6 converts the ion current signal to a voltage signal, and is computed inside the microprocessor 5. Inside the microprocessor 5, a parameter extractor 7 extracts the characteristics of the ion current waveform as ion current parameters correlating to the IMEP.

The parameters extracted by the parameter extractor 7 are inputted into an IMEP calculator 8 and an IMEP variation rate calculator 9, respectively. Then, the IMEP and the IMEP variation rate (COV_IMEP) are each calculated based on these inputs, and are outputted from the microprocessor 5.

As described above, the A/D converter 6, the parameter extractor 7, the IMEP calculator 8 and the IMEP variation rate calculator 9 are provided inside the microprocessor 5.

The IMEP and the IMEP variation rate (COV_IMEP) outputted from the microprocessor 5 are inputted to the ECU 10, and they are used in controlling a stepper motor 11. The stepper motor 11 controls the degree of opening of the EGR valve. When the ECU 10 judges that they does not reach to the EGR limit point, the ECU 10 increases the stepper motor 11 by one step, whereby opening the EGR valve 12 and increasing the EGR amount.

Figure 2:
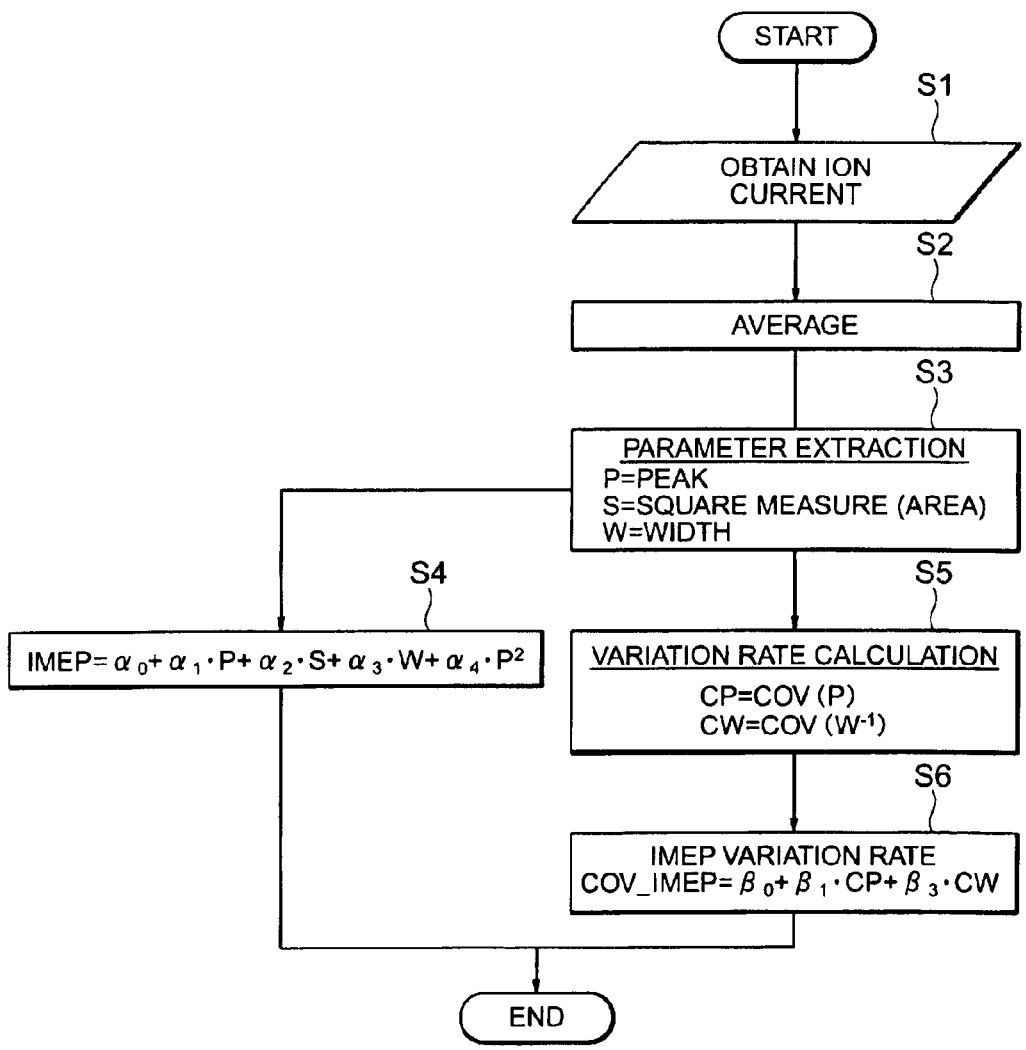
FIG. 2 is a flowchart showing a flow of procedure for deriving a magnitude of an IMEP and an IMEP variation rate in the EGR limit control device of the internal combustion engine in accordance with Embodiment 1 of the present invention.

Next, description is given of operations of the microprocessor 5 with reference to a flowchart shown in FIG. 2.

First, an ion current waveform is obtained in step S1 one after another. A predetermined number of the ion current wave forms each of which is obtained in step S1 are stored in step S2, and an average waveform of them is extracted therefrom. Many elements other than impulse noise compound with each other to produce undulation in the ion current waveform generated when combustion occurs. Therefore, in order to accurately grasp the parameters that correlate highly with the IMEP, it is necessary to know frequently occurring characteristics. In this respect, obtaining the average waveform is important. As described here, Embodiment 1 is configured so as to utilize the average waveform, thus improving the reliability of the detected parameters relevant to combustion.

The average waveform is extracted from the waveforms of a predetermined number of previous ignitions before this time. The average waveform is updated upon each ignition. Therefore, the measurements can be taken in real time, which improves precision.

At step S3, the characteristics parameters are extracted from the waveform that was averaged at step S2. According to Embodiment 1 of the present invention, the characteristics parameters of the ion current correlating to the IMEP are as follows: a peek value (P) within a given range, a square measure (S) (i.e. an area) within a given range, and a width (W) indicated by an amount of time that the ion current exceeds a given threshold within a given range. Note that, the given range is a given detection window for placing the focus on the portion that is featured by the characteristics parameters. Therefore, at step S3, processing is performed on the signal that is in the given range and has passed through the analog low-pass filter 4 in FIG. 1 and the detection window, and from which the impulse noise not related to combustion has been eliminated. As a result, it becomes possible to improve the reliability of the characteristics parameters, to effectively obtain the intended parameters, and to extract only the parameters strongly correlated with the IMEP.

At step S4, P, S and W are selected from the characteristics parameters that were extracted at step S3. They can be multiplied to a given power, if necessary. Each of these is multiplied by certain coefficients $\alpha 1, \alpha 2, \alpha 3, \ldots$, and these are added to a constant $\alpha 0$ to obtain the IMEP. In Embodiment 1, the magnitude of the IMEP is calculated as the result of the linear equation in formula (1). Thus, the magnitude of the IMEP can be derived efficiently and precisely.

$$IMEP = \alpha_0 + \alpha_1 \cdot P + \alpha_2 \cdot S + \alpha_3 \cdot W + \alpha_4 \cdot P^2 \qquad (1)$$

Figure 4:
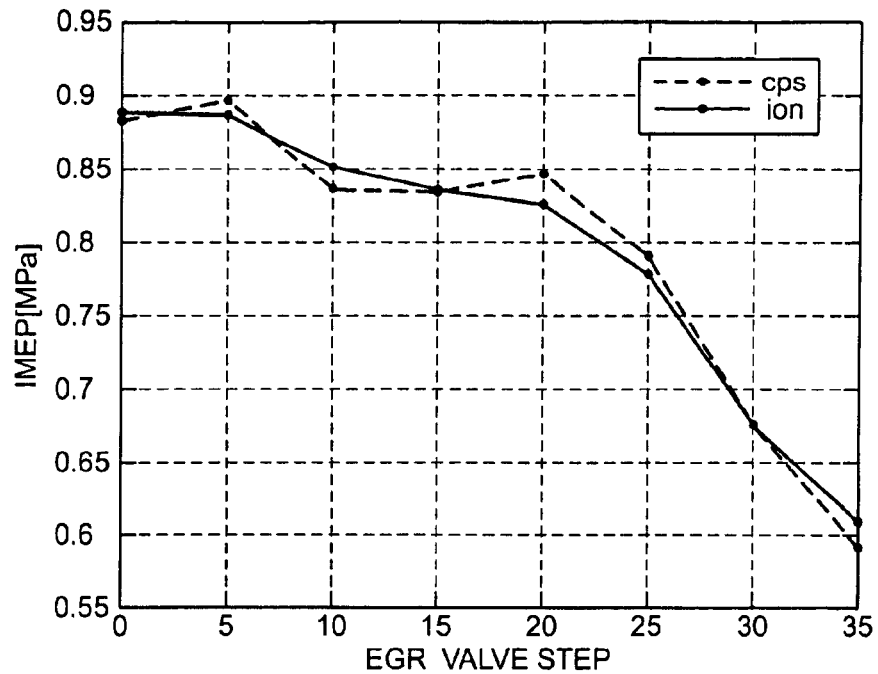
FIG. 4 is an explanatory diagram showing one example of values derived as the magnitude of the IMEP in the EGR limit control device of the internal combustion engine in accordance with Embodiment 1 of the present invention.

FIG. 4 shows an example of the detections made at this time. The solid line in FIG. 4 indicates the IMEP value calculated using the above-mentioned formula (1). The dotted line in FIG. 4 indicates the IMEP values calculated, based on an output from a cylinder-pressure sensor. Since the solid line is almost identical to the dotted line, it is evident that the output in Embodiment 1 is very precise. Means may be provided for modifying the power and the coefficient to modify them when necessary.

At step S5, P and W are selected from the group of parameters that were extracted at step S3. If necessary, these parameters can be multiplied to a given power. In this way a fixed number of optimally rearranged parameter arrays are selected, and then formula (2) is used to calculate their variation rate (COV).

$$P = COV(P)$$
$$CW = COV(W^{-1}) \qquad (2)$$

At step S6, the variation rate obtained as described above is then multiplied by given coefficients $\beta 1, \beta 2$, similarly to obtaining the magnitude of IMEP using the above-mentioned formula (1). Then, result of adding the coefficients is added to a given constant $\beta 0$, whereby obtaining the IMEP variation rate (COV_IMEP). Formula (3) shows the formula used in Embodiment 1. The IMEP variation rate is calculated as the result of the linear equation in formula (3). Thus, the IMEP variation rate can be derived efficiently and precisely.

$$COV\_IMPE=\beta_0+\beta_1 \cdot CP+\beta_2 \cdot CW \quad (3)$$

Figure 5:
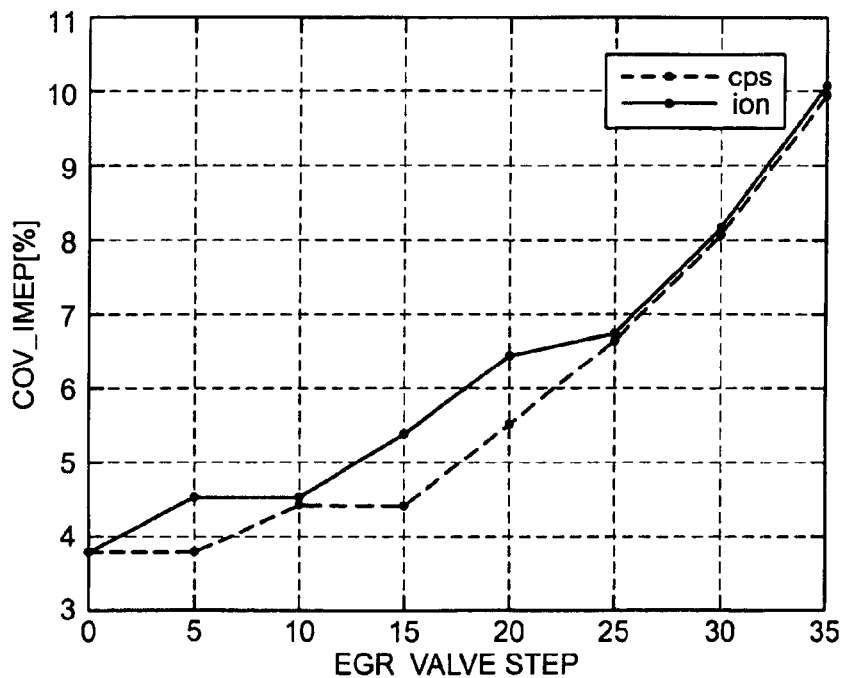
FIG. 5 is an explanatory diagram showing an example of values derived as the IMEP variation rate of the EGR limit control device of the internal combustion engine in accordance with Embodiment 1 of the present invention.

FIG. 5 shows an example of detections made at this time. The solid line in FIG. 5 indicates the IMEP value calculated using the above-mentioned formula (3). The dotted line in FIG. 5 indicates the IMEP variation rate, which is calculated based on the outputs from the cylinder pressure sensor. Since the solid line is almost identical to the dotted line, it is understood that the output in Embodiment 1 is precise. Note that means for modifying the coefficient may also be provided, and the coefficient maybe provided as needed. Also note that only the coefficient was multiplied in the example, but it is also possible to multiply to a given power if necessary.

Figure 3:
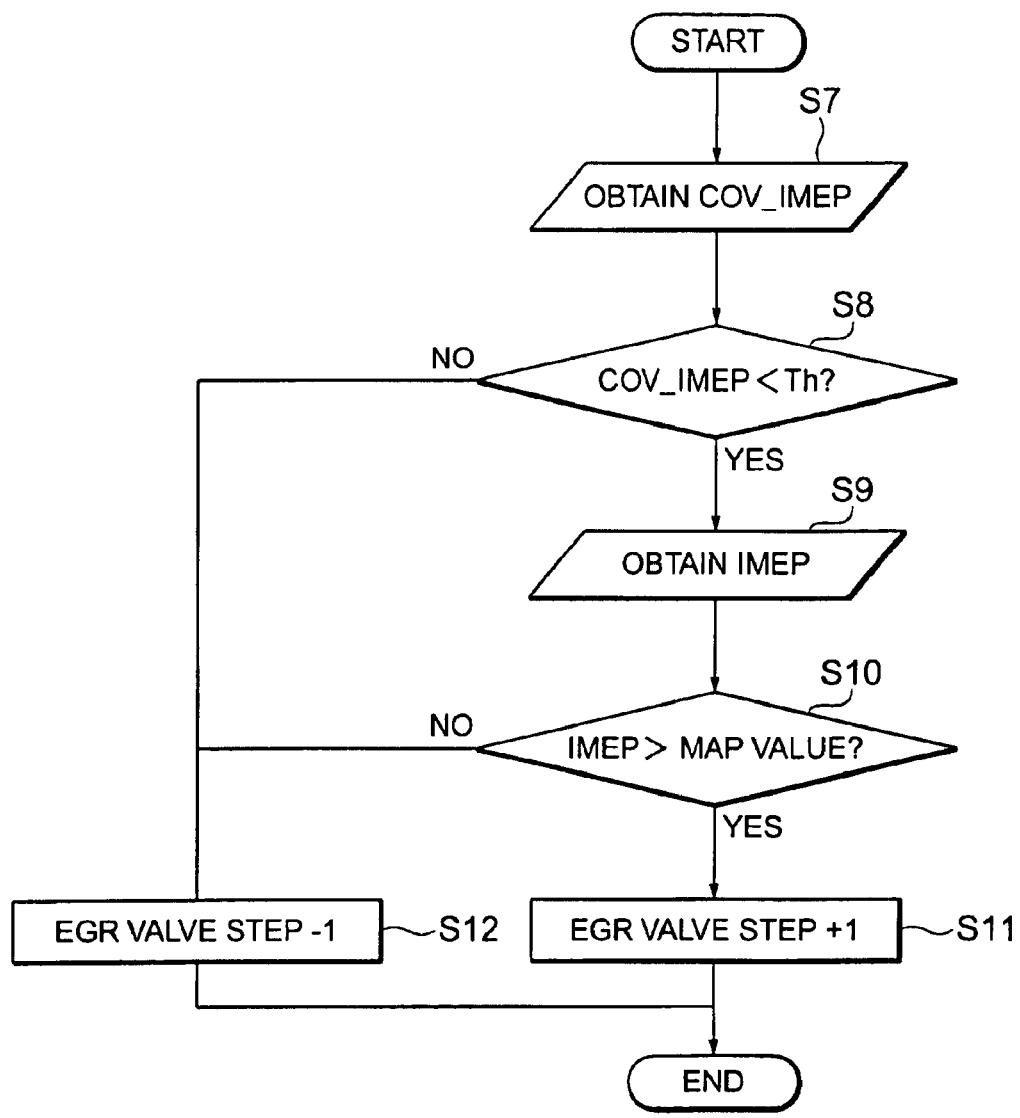
FIG. 3 is a flowchart showing a flow of EGR limit determination procedure in the EGR limit control device of the internal combustion engine in accordance with Embodiment 1 of the present invention.

Next, description is given of an EGR limit determination that is performed in the ECU 10 with reference to FIG. 3.

First, COV_IMEP is obtained at step S7. The COV_IMEP is compared with a given threshold value That step S8. If the COV_IMEP exceeds the threshold value Th, then the combustion is judged to be unstable. In this case, the process advances to step S12, and the EGR valve step is returned one or more. The number of steps that the valve is returned depends on the exceeding degree from the threshold value Th at step S8. If the COV_IMEP does not exceed the threshold value Th at step S8, then it is judged that the combustion is stable, and the process advances to the next process step S9.

The IMEP obtained at step 9 is compared with the map value (MAP value), which is the initial IMEP value set for each operation state at step S10. When the IMEP is equal to or lower than the map value, it is judged that the work efficiency is decreased. In this case, the process advances to step S12, and the EGR valve step is returned one or more. The number of steps that the valve is returned depends on the result of the comparison made at step S10. If the IMEP is larger than the map value (MAP value) at step S10, then it is judged that the work efficiency can be increased further. In this case, the process advances to step S11, the EGR valve is increased by one step, and control is performed to increase the EGR rate.

The above-mentioned series of operations enables tracking of the EGR limit point in real time, and enables the operation efficiency of the engine to be raised to the maximum, and the fuel consumption to be decreased. Thus, the IMEP-related information obtained using the ion current detector can be used to control the engine more efficiently in this embodiment. Further, since the IMEP-related information that is obtained includes the IMEP and the IMEP variation rate, the correlation between the extracted parameters and the IMEP are accentuated further. This increases precision in detecting the IMEP-related information.

Embodiment 2

According to the above-mentioned Embodiment 1, at step S2 of FIG. 2, in order to achieve precision the average waveform is first calculated from the inputted waveforms themselves, and this average waveform is used for extracting the parameters. However, in Embodiment 2, the waveform averaging process of step S2 is omitted, the characteristics parameters are extracted from the ion waveforms occurring with each ignition, and the characteristics parameters average that is taken from a predetermined number of previous ignitions is updated upon each ignition, or a moving average derivation is used at step S3. In this case, the extracted characteristics parameter values are averaged and then used, thereby improving the precision of the parameter detection precision, and essentially obtaining the same effect as in Embodiment 1. Furthermore, the computational burden is alleviated since the waveform averaging process of step S2 is eliminated, which effectively reduces costs associated with the microprocessor 5 portion.

Embodiment 3

According to the above-mentioned Embodiment 1, at step S2 shown in FIG. 2, in order to achieve precision, the average waveform is first calculated from the inputted waveforms themselves, and this average waveform is used for extracting the parameters. However, in Embodiment 3, the waveform averaging process of step S2 is omitted and the IMEP and COV_IMEP are calculated directly from the characteristics parameters from the ion waveforms generated with each ignition at step S3. Even in this configuration, while detection precision does suffer somewhat, computational burden is alleviated, which effectively reduces costs associated with the microprocessor 5 portion.

Embodiment 4

In the above-mentioned Embodiment 1, at step S2 in FIG. 2 the average waveform is produced by averaging and updating the waveforms from a predetermined number of previous ignitions, thereby improving precision while maintaining real time tracking. However, in Embodiment 4, the waveform averaging process is paused until all the waveforms from a predetermined number of ignitions are obtained, and other process is performed in the mean time. In this configuration real-time tracking is sacrificed; however, the computational burden is dispersed, which effectively reduces costs associated with the microprocessor 5 portion. Alternatively, the types of characteristics parameters that are extracted can be increased. This configuration improves the IMEP and the COV_IMEP detection precision. Alternatively, a more sophisticated calculation method can be applied to the IMEP and COV_IMEP detection.

Embodiment 5

According to the above-mentioned Embodiment 1, the magnitude of the IMEP is calculated using Formula (1). However, in Embodiment 5, P and S are selected from the characteristics parameters extracted at step S3, and these are raised to a given power or are multiplied by a coefficient as needed. In Embodiment 5, the magnitude of the IMEP is calculated using the following Formula (4) at step S4.

$$IMEP=\alpha_0+\alpha_1 \cdot P+\alpha_2 \cdot S \quad (4)$$

When using this configuration the level of precision suffers somewhat, but essentially the same results are obtained as in Embodiment 1. Moreover, the computational burden on the microprocessor 5 is alleviated, which effectively reduces the costs associated with the microprocessor 5 portion.

Embodiment 6

According to the above-mentioned Embodiment 1, the IMEP variation rate is calculated using Formula (3). However, in Embodiment 6, just W is selected from the characteristics parameters extracted at step S3, and this is raised to a given power or is multiplied by a coefficient as needed. More specifically, the IMEP variation rate is calculated using the following Formula (5) at step S6. In this configuration as well, results are obtained which are essentially similar to those of Embodiment 1.

$$COV\_IMEP=\beta_0\beta_1 \cdot cov(W)+\beta_2 \cdot cov(W^{-1}) \quad (5)$$

Formula (5) is applied when the magnitude of the IMEP is not used, such as in lean operation limit control, which is shown in Embodiment 10 and is described below. Using Formula (5) enables just W to be used as the extracted parameter. This alleviates the computational burden, which is effective for reducing costs associated with the microprocessor portion 5.

Embodiment 7

In the above-mentioned Embodiment 1, the EGR valve control shown in FIG. 3 performs a real-time comparison of the output obtained in FIG. 2 with the predetermined value, whereby the EGR limit point detection is performed. However, in Embodiment 7, ECU 10 includes average amount calculating means for calculating an average amount of the output from the IMEP calculator 8 and calculating an average amount of the output from the IMEP variation rate calculator 9. Therefore, ECU 10 controls operations of the internal combustion engine based on an output from the average amount calculating means.

Namely, in Embodiment 7, the value obtained at step S7 or step S9 (i.e., COV_IMEP or IMEP) is judged at step S8 or step S10 by comparing the average taken from the predetermined number of previous ignitions and is updated upon each ignition, or the moving average derivation, with a predetermined threshold value. Performing this comparison prevents faulty control caused by faulty detection and the like. In turn, the operating efficiency of the engine is raised to the maximum, thus reducing fuel consumption and the like.

Embodiment 8

In the above-mentioned Embodiment 1, the EGR limit point detection is performed in real time, and control is performed to track the EGR limit in real time. However, in Embodiment 8, the operating state is monitored and the previously determined EGR limit amount is maintained until the variation appears in the operating state. This alleviates the computational burden on the ECU 10.

Embodiment 9

Figure 6:
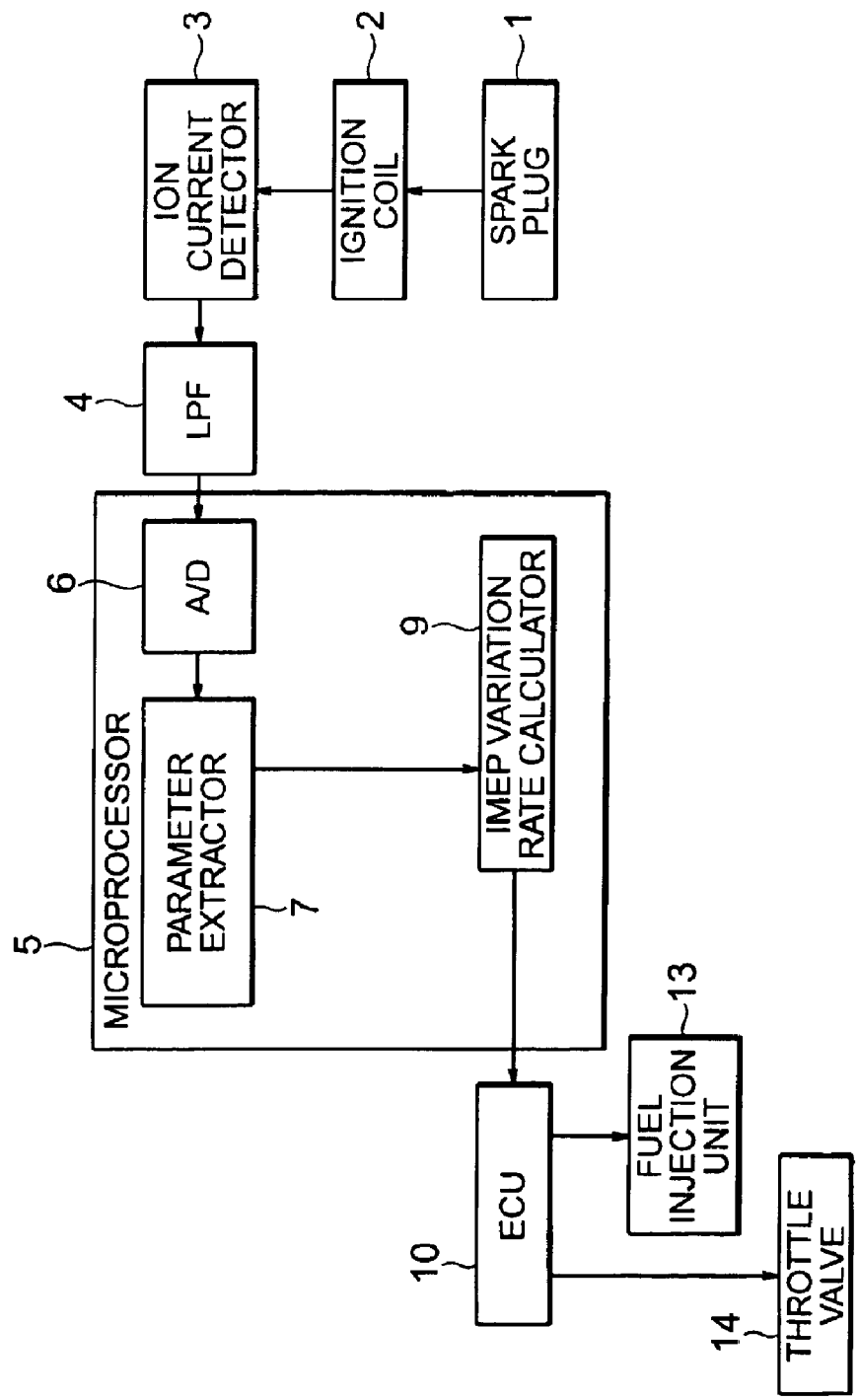
FIG. 6 is a block diagram showing a construction of a lean combustion limit control device of an internal combustion engine in accordance with Embodiment 9 of the present invention.

FIG. 6 illustrates a lean combustion limit control device of an internal combustion engine in accordance with Embodiment 9. Points differing from the construction of the EGR limit control device shown in FIG. 1 include: not providing the IMEP calculator 8 inside the microprocessor 5, and the ECU 10 utilizing the COV_IMEP outputted from the microprocessor 5 to control a fuel injection unit 13 and a throttle valve 14. Other constructions are similar to those shown in FIG. 1, and their explanations are omitted here.

In the above-mentioned Embodiment 1 the focus is placed on the EGR limit control. However, as in a device according to Embodiment 9 shown in FIG. 6, it is also possible to use just the COV_IMEP detection amount to detect a stable operation limit to perform the lean combustion limit control.

Embodiment 10

In the above-mentioned Embodiment 1 the focus is placed on the EGR limit control. However, it is also possible to use just the IMEP magnitude detection amount to detect a maximum torque operation limit and perform MBT control.

Embodiment 11

In the above-mentioned Embodiment 1 the analog low-pass filter 4 is used to eliminate the output noise from the ion current detector 3 shown in FIG. 1. However, the present invention is not limited to this configuration. In Embodiment 11, either the analog band-pass filter is used, or a digital band-pass filter or digital low-pass filter inside the microprocessor 5 is used. Similar results can also be obtained with this configuration.

What is claimed is:

1. A control device for an internal combustion engine, comprising:

an ion current detecting means for detecting an ion current flowing between electrodes, via ions generated in a combustion chamber upon combustion, at a time when a voltage is applied to said electrodes disposed in said combustion chamber of said internal combustion engine;

a parameter extracting means for extracting an ion current characteristics parameter correlating to an IMEP, from said ion current detected by said ion current detecting means;

an IMEP-related-information calculating means for using said ion current characteristics parameter outputted from said parameter extracting means, to calculate information relating to said IMEP of said internal combustion engine; and an internal combustion engine control means for controlling operations of said internal combustion engine based on said output from said IMEP-related-information calculating means.

2. A control device for an internal combustion engine according to claim 1, wherein said parameter extracting means comprises:

a waveform averaging means for deriving an average waveform averaged from ion current waveforms with respect to a predetermined number of ignitions detected by said ion current detecting means; and first characteristics extracting means for extracting a characteristics of said average waveform outputted from said waveform averaging means.

3. A control device for an internal combustion engine according to claim 2, wherein said first characteristics extracting means comprises:

a filtering means for eliminating noise not related to combustion; and a range setting means for setting a predetermined range to focus on each characteristics extracted by said first characteristics extracting means, wherein information relating to at least one of the following is extracted by said first characteristics extracting means as said characteristics, from signal components passing through said filtering means: a peak value within said range, a range area within said range, and an amount of time that said ion current exceeds a predetermined threshold value within said range.

4. A control device for an internal combustion engine according to claim 1, wherein said parameter extracting means comprises:

a second characteristics extracting means for extracting a characteristics of ion current waveforms with respect to a predetermined number of ignitions detected by said ion current detecting means; and a characteristics averaging means for averaging a value for said characteristics of ion current waveforms extracted by said second characteristics extracting means.

5. A control device for an internal combustion engine according to claim 3, wherein said second characteristics extracting means comprises:

a filtering means for eliminating noise not related to combustion; and a range setting means for setting a predetermined range to focus on each characteristics extracted by said second characteristics extracting means, wherein information relating to at least one of the following is extracted as by said second characteristics extracting means said characteristics, from signal components passing through said filtering means: a peak value within said range, a range area within said range, and an amount of time that said ion current exceeds a predetermined threshold value within said range.

6. A control device for an internal combustion engine according to claim 1, wherein said IMEP-related-information calculating means comprises:

an IMEP calculating means for calculating said IMEP using said ion current characteristics parameter outputted from the parameter extracting means; and an IMEP variation rate calculating means for calculating an IMEP variation rate using at least one of outputs from said parameter extracting means and said IMEP calculating means.

7. A control device for an internal combustion engine according to claim 6, wherein said IMEP calculating means comprises first power/coefficient-setting means for setting a power and a coefficient to multiply with said ion current characteristics parameter outputted from said parameter extracting means, in order to calculate said IMEP, wherein said ion current characteristics parameter outputted from said parameter extracting means is a variable, and said IMEP is calculated as a result of a predetermined linear equation set using said first power/coefficient-setting means.

8. A control device for an internal combustion engine according to claim 6, wherein said IMEP variation rate calculating means comprises:

a parameter variation rate calculating means for calculating a variation rate of said ion current characteristics parameter outputted from said parameter extracting means; and a second power/coefficient-setting means for setting a power and a coefficient to multiply with said ion current characteristics parameter variation rate outputted from said parameter variation rate calculating means, in order to calculate said IMEP variation rate value, wherein the output from said parameter variation rate calculating means is a variable, and said IMEP variation rate is calculated as a result of a predetermined linear equation set using said second power/coefficient-setting means.

9. A control device for an internal combustion engine according to claim 1, wherein said internal combustion engine control means comprises average amount calculating means for calculating an average amount of the output from said IMEP calculating means, and said internal combustion engine control means controls operations of said internal combustion engine based on an output from said average amount calculating means.

* * * * *